(12) United States Patent
Sadek et al.

(10) Patent No.: US 8,264,102 B2
(45) Date of Patent: Sep. 11, 2012

(54) DEVICE FOR FLEXIBLE POWER TRANSMISSION AND DEICING OF A HIGH-VOLTAGE POWER LINE BY MEANS OF DIRECT CURRENT

(75) Inventors: Kadry Sadek, Erlangen (DE); Frank Schettler, Erlangen (DE); Karl Ücker, Langensendelbach (DE)

(73) Assignee: Siemens Aktiengesellschaft, Munich (DE)

( * ) Notice: Subject to any disclaimer, the term of this patent is extended or adjusted under 35 U.S.C. 154(b) by 324 days.

(21) Appl. No.: 12/515,027

(22) PCT Filed: Nov. 14, 2007

(86) PCT No.: PCT/EP2007/062324
§ 371 (c)(1),
(2), (4) Date: May 15, 2009

(87) PCT Pub. No.: WO2008/061924
PCT Pub. Date: May 29, 2008

(65) Prior Publication Data
US 2010/0033028 A1      Feb. 11, 2010

(30) Foreign Application Priority Data

Nov. 21, 2006   (DE) .......................... 10 2006 055 575

(51) Int. Cl.
*H05K 7/14*      (2006.01)
(52) U.S. Cl. ......... 307/149; 340/324; 343/704; 361/333
(58) Field of Classification Search .................. 307/149, 307/105, 147
See application file for complete search history.

(56) References Cited

U.S. PATENT DOCUMENTS 3,290,578 A * 12/1966 Ainsworth ....................... 363/39
(Continued)

FOREIGN PATENT DOCUMENTS

DE           154658 A1    4/1982
(Continued)

OTHER PUBLICATIONS

Pundt, H.: "Elektroenergiesysteme" 3. Lehr- and Organisationsmittel des Ministeriums für Bildung, Zwickau ZHF/87/90/1480—ZLO 649/90, 3. Ausgabe, 3. Auflage, Mar. 1982, pp. 44-47—Statement of Relevance.

(Continued)

*Primary Examiner* — Rexford Barnie
*Assistant Examiner* — Toan Vu
(74) *Attorney, Agent, or Firm* — Laurence A. Greenberg; Werner H. Stemer; Ralph E. Locher

(57) ABSTRACT

In order to provide an apparatus (1) for flexible power transmission and for deicing of a high-voltage line, which has a plurality of phases, by means of direct current, with an AC voltage connection of the high-voltage line which has a number of phases corresponding to the phases of the high-voltage line, each phase having at least one inductance (6) and a valve circuit (10) connected in series with each inductance (6), with the valve circuit (10) being connected by means of a junction point (11) to the AC voltage connection, and having a first current path (14) with a first power semiconductor valve (12) and a second current path (15) with a second power semiconductor valve (13), with the power semiconductor valves (12, 13) being connected in opposite senses with respect to one another with reference to the junction point (11) and in which case the first and the second current path (15) can be connected to a TCR star point by means of at least one star point switch (16, 17), whose design is simple and at the same time costs little, it is proposed that the TCR star point (18) is connected via a connecting line to a star point of a zero phase-sequence system suppression means (2, 21).

4 Claims, 2 Drawing Sheets

U.S. PATENT DOCUMENTS

| | | | | |
|---|---|---|---|---|
| 4,082,962 A | * | 4/1978 | Burgsdorf et al. | 307/147 |
| 4,096,431 A | | 6/1978 | Hammarlund | |
| 4,126,792 A | * | 11/1978 | Genrikh et al. | 307/112 |

FOREIGN PATENT DOCUMENTS

| | | | |
|---|---|---|---|
| GB | 2418079 A | * | 3/2006 |
| JP | 03086022 A | | 4/1991 |
| JP | 2000014006 A | | 1/2000 |
| RU | 22353697 C2 | | 8/2004 |
| SU | 664124 A | | 5/1979 |
| SU | 888265 A1 | | 12/1981 |
| WO | 2006027376 A1 | | 3/2006 |

OTHER PUBLICATIONS

Heuck et al.: "Elektrische Energieversorgung", Vieweg, Braunschweig, 1984, ISBN: 3-528-03351-7, pp. 306-311—Statement of Relevance.

Gardner et al.: "Digital computer studies and some test results for a static VAr compesator in the UK transmission network" GEC ALSTON Transmission & Distribution Projects Limited, UK, AC and DC Power transmission, 1991 International Conference on London, UK Jan. 1, 1991 pp. 319-324, XP 006516032.

Gyugyi, L: "A unified power flow control concept for flexible AC transmission systems" Westingshouse Electric Corporation, USA, AC and DC Power Transmission, 1991, London, UK, IEE, UK Jan. 1, 1991, pp. 19-26, XP006515985.

Boshoff et al: "Digital and Real Time Studies of the Eskom Svcs", AC and DC Power Transmission, Sixth International Conference on (Conf. Publ. No. 423), IEE, Jan. 1, 1996 pp. 363-368, XP 006506968.

Ruhr University Bochum: "Fundamentals of Energy Management" EELE Lecture Text, Chair of Electrical Engineering and Power Electronics, Ruhr University, Bochum, Germany, Status: Aug. 25, 2004, Table of contents and pp. 153-156.

German Office Action dated Sep. 5, 2007.

International Search Report dated Jul. 1, 2008.

German Office Action dated Jul. 15, 2009.

* cited by examiner

DEVICE FOR FLEXIBLE POWER TRANSMISSION AND DEICING OF A HIGH-VOLTAGE POWER LINE BY MEANS OF DIRECT CURRENT

BACKGROUND OF THE INVENTION

Field of the Invention

The invention relates to an apparatus for flexible power transmission and for deicing of a high-voltage line, which has a plurality of phases, by means of direct current, with an AC voltage connection of the high-voltage line which has a number of phases corresponding to the phases of the high-voltage line, each phase having at least one inductance and a valve circuit connected in series with each inductance, with the valve circuit being connected by means of a junction point to the AC voltage connection, and having a first current path with a first power semiconductor valve and a second current path with a second power semiconductor valve, with the power semiconductor valves being connected in opposite senses with respect to one another with reference to the junction point and in which case the first and the second current path can be connected to a TCR star point by means of at least one star point switch.

One such apparatus is already known from WO 2006/027376 A1, which describes the method of operation of a so-called high-voltage direct-current transmission installation and a method of operation of a so-called thyristor-controlled reactor, or TCR for short. This document also discloses that a high-voltage direct-current transmission installation (HVDCT installation) can be converted by means of a switch arrangement to a TCR, or a TCR can be converted to an HVDCT installation. For example, the already known apparatus has an AC voltage connection and a DC connection, between which a polyphase series circuit is connected. In this case, each phase of the series circuit has at least one inductance and a valve circuit. The valve circuit has a junction point which splits the current path into a first current path and a second current path. Each current path is fitted with a power semiconductor valve, with the valves being oriented in opposite senses with respect to one another, with reference to the junction point. The first current path and the second current path of all the phases can be connected to one another via a star-point switch, thus forming a TCR star point. When the star-point switch is open, a converter of a so-called six-pulse bridge circuit is formed, which allows rectification of the alternating current produced by the AC voltage connection. The direct current which is produced in this way can then be fed into a high-voltage line, for deicing. The already known apparatus has the disadvantage that, when the star-point circuit is selected, the uneven multiples of the third harmonic of the rated current are produced. However, it is undesirable to feed these harmonics into the connected AC voltage network. Furthermore, the phase currents cannot be formed independently of one another, because of the star circuit, thus adversely affecting the control of the TCR operation of the already known apparatus.

By way of example, apparatuses of the type mentioned above are used for deicing of high-voltage lines. Particularly in relatively cold climates, high-voltage lines, for example overhead lines which are used for transmission of alternating currents, are loaded by the formation of snow and ice on the high-voltage line. The weight of this ice may be up to several tonnes and may lead to mechanical damage to the high-voltage line. A direct current can be injected in a controlled manner into the high-voltage line in order to melt the ice, with this direct current heating the high-voltage line and thus causing the snow or the ice to melt and fall off. Particularly in the case of long high-voltage lines, whose length may exceed several hundred kilometers, direct current is more suitable than alternating current, since it can be controlled better.

BRIEF SUMMARY OF THE INVENTION

The object of the invention is to provide an apparatus of the type mentioned initially, whose design is simple, and which costs little at the same time.

The invention achieves this object in that the TCR star point is connected via a connecting line to a star point of a zero phase-sequence system suppression means.

Like the apparatus of the generic type, the apparatus according to the invention has two operating modes. In the TCR mode, reactive power is absorbed from the high-voltage line to which the apparatus according to the invention is connected. In the so-called HVDCT mode, in contrast, a direct current can be deliberately injected into the connected high-voltage line. For the purposes of the invention, the phases of the apparatus are connected to one another in star in the TCR mode, although WO 2006/027376 A1 indicates that star connection has the disadvantage that these third or ninth harmonics of the rated current cannot be suppressed or absorbed, as a result of which these harmonics can flow into the connected AC voltage network without any impediment. In the following text, these currents are referred to as zero phase-sequence system currents, since these harmonics are not automatically extinguished in a star-connected TCR, in contrast to harmonics in a positive phase-sequence system or negative phase-sequence system. For the purposes of the invention, in order to prevent zero phase-sequence system currents in the AC voltage network, the TCR star point is connected to a star point of a zero phase-sequence system suppression means. The zero phase-sequence system current therefore flows via the star point of the TCR to the star point of the zero phase-sequence system suppression means, which prevent zero phase-sequence system current from being introduced into the connected AC voltage network. This makes it possible to avoid the need for complex delta connection with a large number of isolating switches. The design of the apparatus according to the invention is therefore simple, and it costs little. According to the invention, in the TCR mode, the zero phase-sequence system current flows via ground from the TCR star point to the grounding point of the zero phase-sequence system suppression means, and from the zero suppression means via the connected star-point switch back to the star point of the TCR, thus forming a closed circuit. According to the invention, an additional current path is also provided, which has such a low impedance for the zero phase-sequence system current that this prevents zero phase-sequence system currents from being fed into the connected high-voltage line.

The connecting line is advantageously a ground connection. In other words, the TCR star point and the star point of the zero phase-sequence system suppression means are grounded. This solution costs little, of course.

In contrast to this, the connecting line is a metallic connecting line.

The zero phase-sequence system suppression means is advantageously a transformer which has a primary winding connected in delta and a secondary winding connected in star. If the connecting line is a ground line, then both the TCR star point and the star point of the secondary winding are grounded. In the TCR mode, the zero phase-sequence system thus flows from the TCR star point to the transformer, with the primary winding of the transformer, which is connected in delta, preventing zero phase-sequence system currents from being fed into the connected AC voltage network.

In contrast to this, the zero phase-sequence system suppression means is at least one zero phase-sequence system filter. The zero phase-sequence system filter is, for example, tuned to have a low impedance for the third harmonic, and has an expedient circuit formed by inductances and capacitors. The zero phase-sequence system filter has a number of phases corresponding to the phases of the high-voltage line, with the phases of the zero phase-sequence system filter being connected to one another at a star point. Said star point is connected to the TCR star point either via a metallic connecting line or else via a ground circuit. In other words, the star point of the zero phase-sequence system filter is grounded. Zero phase-sequence system filters are known per se to a person skilled in the art, as a result of which they do not need to be described in any more detail at this point. When star-point switches are closed, the apparatus according to the invention for zero phase-sequence system currents therefore provides a closed circuit with a low impedance.

Each phase advantageously has a plurality of inductances, in which case at least one inductance can be bridged by means of a bridging switch. For example, when the apparatus is in the so-called TCR mode, the additional inductances are not bridged, with the increased inductance having a positive effect on the operation of the apparatus. In the so-called HVDCT mode, in contrast, it is expedient to decrease the inductance by bridging at least one of the additional inductances.

Filter means are advantageously provided for suppression of the fifth, seventh and/or twelfth harmonics. The additional filter means prevent said harmonics, which are not part of the zero phase-sequence system, from loading the high-voltage line which can be connected to the apparatus.

Further expedient refinements and advantages of the invention are the subject matter of the following description of the exemplary embodiments of the invention with reference to the figures of the drawing, in which the same reference symbols refer to components having the same effect, and in which,

DESCRIPTION OF THE INVENTION

Figure 1:
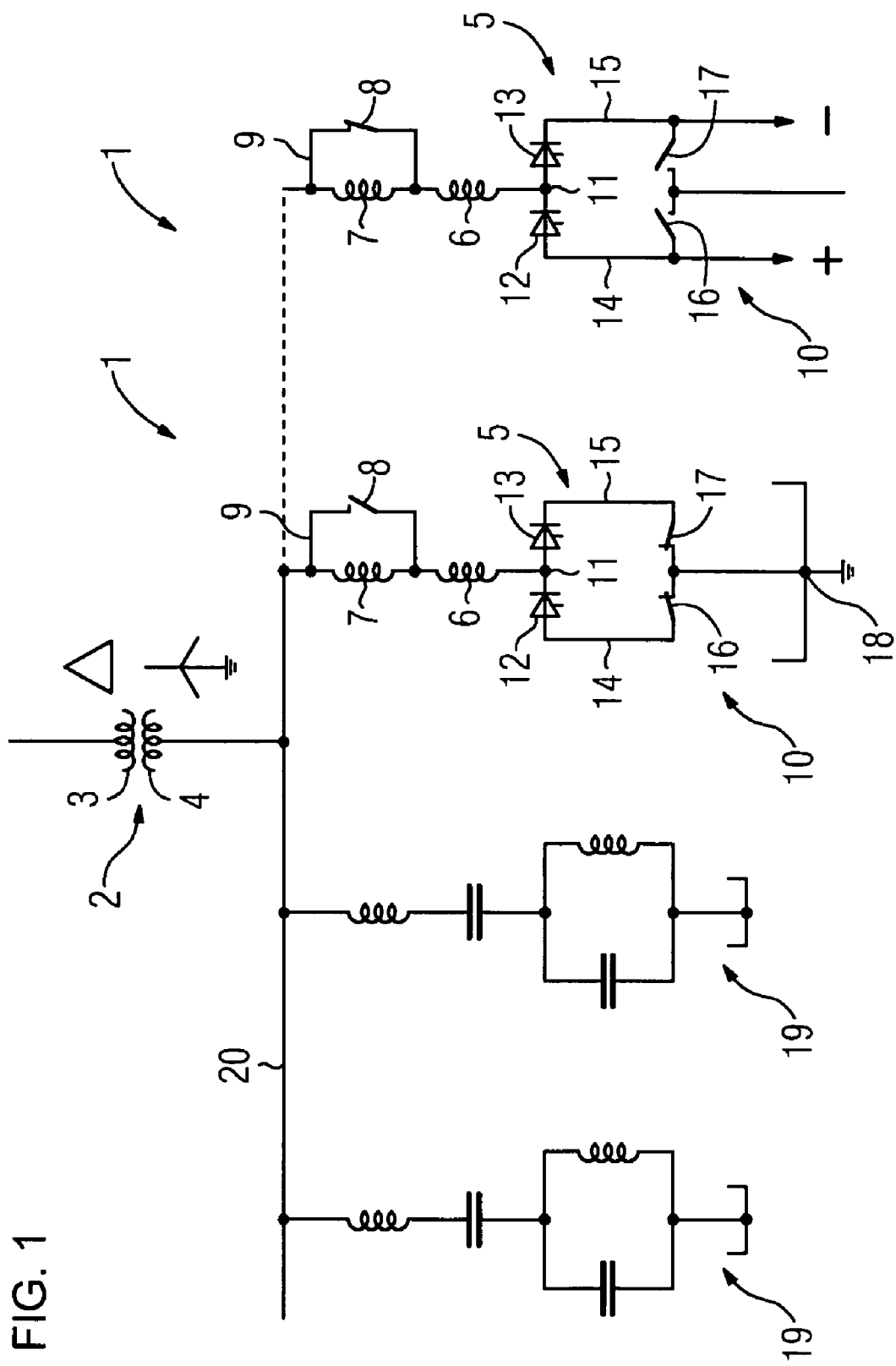
FIG. 1 shows a first exemplary embodiment of the apparatus according to the invention.
Figure 2:
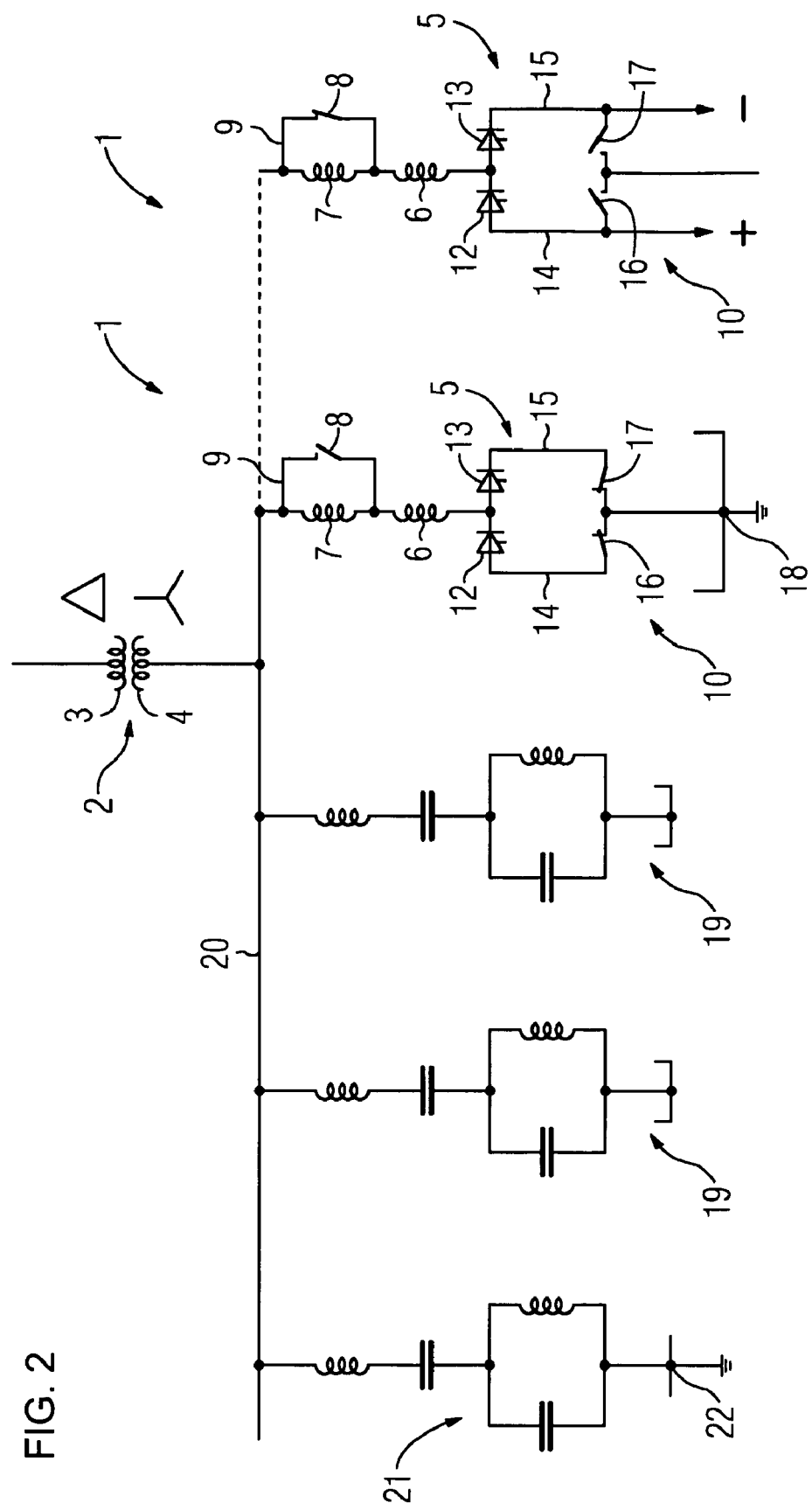
FIG. 2 shows a second exemplary embodiment of the apparatus according to the invention.

FIG. 1 shows a first exemplary embodiment of the apparatus 1 according to the invention, which has a transformer 2 as the AC voltage connection. In other words, the transformer 2 is used for connection of the apparatus 1 according to the invention to a polyphase high-voltage line which is not illustrated in FIG. 1. The apparatus 1 therefore likewise has a plurality of phases, of which only one phase is illustrated in FIGS. 1 and 2, for clarity reasons. In general, the apparatus according to the invention has three phases.

The transformer 2 has a primary winding 3 and a secondary winding 4. The phases of the primary winding 3 are connected to one another in what is referred to as delta. The phases of the secondary winding 4 form a common star point with one another, which is grounded. The apparatus 1 according to the invention furthermore has a series circuit 5, which has an inductance 6 and an inductance 7. A bridging switch 8 is provided in parallel with the inductance 7, and is arranged in a bridging path 9.

Furthermore, the series circuit 5 has a valve circuit 10 with a junction point 11 which is arranged between two power semiconductor valves 12 and 13. The power semiconductor valves 12 and 13 are arranged in opposite senses with respect to one another, with reference to the junction point 11. The power semiconductor valve 12 is arranged in a first current path 14 while, in contrast, the power semiconductor valve 13 is arranged in a second current path 15, with the current paths 14 and 15 being connected to a TCR star point 18 via a first isolating switch 16 and via a second isolating switch 17, respectively. FIG. 1 indicates that the phases, which are not shown there, can likewise be connected to the TCR star point 18 via their valve circuit 10. In this case, the TCR star point 18 is grounded. The apparatus 1 is shown with the switches 16 and 17 closed, and is therefore in the so-called TCR mode and is used to absorb reactive power from the polyphase high-voltage line. For this reason, the bridging switch 8 is open, thus providing an increased inductance in the series circuit 5, which increased inductance is advantageous when the apparatus 1 is in the TCR mode. Additional filter means 19, which are known per se to a person skilled in the art and therefore do not need to be described at this point are provided in order to suppress the fifth, seventh, twelfth and/or twenty-fourth harmonics of the rated current. The additional filter means 19 are, for example, not grounded.

The star connection of the apparatus 1 according to the invention results in the harmonics of the positive phase-sequence and negative phase-sequence system canceling one another out. However, the zero phase-sequence system flows via the connecting line, which is in the form of a ground connection, from the TCR star point 18 to the star point of the secondary winding 4 and from there, for example back again to the series circuit 5, thus providing a closed circuit with a low impedance. The delta connection of the phases of the primary winding 3 prevents zero phase-sequence system currents from being introduced into the high-voltage line.

FIG. 1 furthermore indicates the HVDCT mode of the apparatus 1 according to the invention. For this reason, a busbar 20 is lengthened only virtually by a dashed line. The HVDCT mode of the apparatus 1 is indicated on the right, at the end of this dashed line. In the HVDCT mode, the switches 16 and 17 are open. For this reason, the first current path 14 is no longer connected to the second current path 15 and is therefore also no longer connected to the TCR star point 18. Furthermore, the bridging switch 8 is closed, so that the inductance 7 of the series circuit 5 is reduced in comparison to that when the apparatus 1 is in the TCR mode. The power semiconductor valves 12 and 13 now no longer act like bidirectional switches but as current valves of a six-pulse bridge circuit, thus providing a so-called rectifier. The current paths 14 and 15 therefore form direct-current connections of the apparatus 1. A smoothing inductor, which is not shown in FIG. 1, is used to smooth the rectified current. The direct current can now be injected into the high-voltage line, and can be used to melt snow and ice there.

FIG. 2 shows a further exemplary embodiment of the apparatus 1 according to the invention. The apparatus 1 according to the invention differs from the exemplary embodiment shown in FIG. 1 in that the star point of the secondary winding 4 is not longer grounded, in contrast to FIG. 1. Instead of this, a zero phase-sequence system filter 21 is provided, whose phases are connected to one another in order to form a filter star point 22. The filter star point 22 is grounded. The zero phase-sequence system can therefore flow in the TCR mode from the TCR star point 18 to the filter star point 22 via ground, with the zero phase-sequence system filter 21 forming a current path with a low impedance for the third harmonic of the current, and thus suppressing the loads caused by the zero phase-sequence system. A plurality of zero phase-sequence system filters 21 may, of course, also be provided within the scope of the invention, and are tuned to other harmonics, for example the ninth harmonic. The important factor is that all the zero phase-sequence system filters have a grounded star point or a star point which is metallically connected to the star point of the TCR, as a result of which the apparatus according to the invention provides a closed circuit which has a low impedance for zero phase-sequence system currents.

The invention claimed is:

1. An apparatus for flexible power transmission and for deicing, by using direct current, of a high-voltage line having a plurality of phases, the apparatus comprising:
  an AC voltage connection for connection to the high-voltage line;
  said AC voltage connection having a number of phases corresponding to the phases of the high-voltage line;
  each of said phases having at least one inductance and a valve circuit connected in series with said inductance;
  a junction point connected between said valve circuit and said AC voltage connection;
  a first current path having a first power semiconductor valve and a second current path having a second power semiconductor valve, said power semiconductor valves being connected in mutually opposite senses with reference to said junction point;
  a TCR star point;
  at least one star point switch for connecting said first and second current paths to said TCR star point;
  a zero phase-sequence system suppression device having a star point; and
  a connecting line connected between said TCR star point and said star point of said zero phase-sequence system suppression device;
  wherein said connecting line is a ground connection;
  wherein said zero phase-sequence system suppression device is a transformer having a primary winding connected in a delta and a secondary winding connected in a grounded star.

2. The apparatus according to claim 1, wherein said inductance is one of a plurality of inductances provided in each phase, and a bridging switch can bridge one of said inductances.

3. The apparatus according to claim 1, wherein at least one of said first or second current paths has a smoothing inductor.

4. The apparatus according to claim 1, which further comprises a filter device for suppression of at least one of the fifth, seventh or twelfth harmonics.

* * * * *